United States Patent
Brandwine et al.

(10) Patent No.: US 10,445,514 B1
(45) Date of Patent: Oct. 15, 2019

(54) REQUEST PROCESSING IN A COMPROMISED ACCOUNT

(71) Applicant: Amazon Technologies, Inc., Reno, NV (US)

(72) Inventors: Eric Jason Brandwine, Haymarket, VA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 980 days.

(21) Appl. No.: 13/896,934

(22) Filed: May 17, 2013

(51) Int. Cl.
*G06F 21/62* (2013.01)

(52) U.S. Cl.
CPC .................. *G06F 21/6209* (2013.01)

(58) Field of Classification Search
CPC ........................ G06Q 40/00; G06F 21/6209
USPC ....................................................... 726/28, 1
See application file for complete search history.

(56) References Cited

U.S. PATENT DOCUMENTS

| | | | |
|---|---|---|---|
| 8,429,708 B1* | 4/2013 | Tandon | G06F 21/00 380/247 |
| 8,768,838 B1* | 7/2014 | Hoffman | 705/44 |
| 9,633,201 B1* | 4/2017 | Katz | G06F 21/55 |
| 2006/0282660 A1* | 12/2006 | Varghese et al. | 713/155 |
| 2008/0141377 A1* | 6/2008 | Dunagan | G06F 21/577 726/25 |
| 2009/0205018 A1* | 8/2009 | Ferraiolo | G06F 21/6218 726/1 |
| 2010/0146602 A1* | 6/2010 | Delia | G06F 21/31 726/6 |
| 2014/0189063 A1* | 7/2014 | Carriero | H04L 67/1095 709/219 |
| 2014/0189829 A1* | 7/2014 | McLachlan | H04L 63/08 726/6 |
| 2014/0228019 A1* | 8/2014 | Mannepally | 455/433 |
| 2014/0244502 A1* | 8/2014 | Zhao | 705/44 |

* cited by examiner

*Primary Examiner* — Khalil Naghdali
(74) *Attorney, Agent, or Firm* — Davis Wright Tremaine LLP

(57) ABSTRACT

A computing resource service provider detects that an account has been compromised. The computing resource service provider applies a set of restrictions on the account. The computing resource service provider denies a request if the request is preempted by the set of restrictions. The computing resource service provider fulfills a request that is not preempted by the set of restrictions.

28 Claims, 10 Drawing Sheets

REQUEST PROCESSING IN A COMPROMISED ACCOUNT

BACKGROUND

Computing resource service providers and other service providers, often grant users access to their services through the use of online user accounts. Many users, for example, utilize these user accounts for, among other reasons, the purpose of archiving data, managing virtual computing system environments and inserting/modifying data in various databases. Despite their many advantages, online user accounts contain inherent risks that are borne by the computing resource service provider and the organizations that utilize them. For example, despite best efforts to avoid it, online user accounts are prone to security breaches resulting from, among other reasons, phishing techniques, social engineering and inadvertent credential releases. Consequently, information that is contained in the user accounts may be susceptible to corruption, loss or unauthorized release. Adequately addressing these risks, such as through disabling an online user account completely, presents additional costs to the organizations that rely on the online user accounts and to the service provider.

BRIEF DESCRIPTION OF THE DRAWINGS

Various embodiments in accordance with the present disclosure will be described with reference to the drawings, in which.

DETAILED DESCRIPTION

Figure 1:
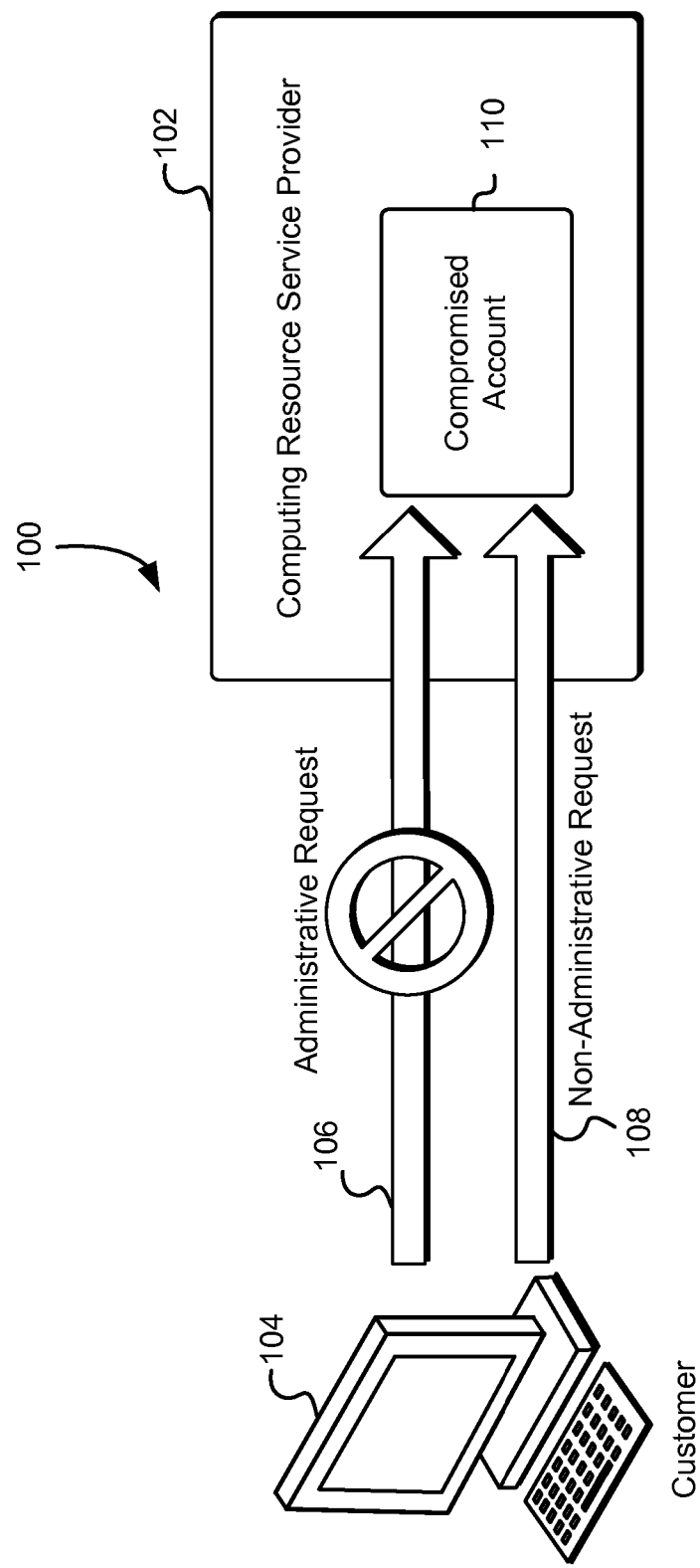
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the processing of a request in a compromised account. In an embodiment, an entity (e.g., an organization) contacts the service, such as through appropriately configured application programming interface (API) calls to the service, to request access to an account (e.g., manage administrative permissions and read and/or write data). The entity may be a customer of a computing resource service provider that operates various services such as data storage services, virtual computing system services and/or database services. Prior to receipt of the request, the service provider may have detected whether the account has been compromised. For instance, the service provider may determine the account is compromised by referring to data contained in public Internet repositories of data and discovering customer credentials (e.g., account passwords, authorization keys (also referred to as access keys)) in these repositories. Additionally, the customer making the request may notify the service provider that a set of credentials used to access the account have been compromised.

In various embodiments, the computer resource service provider may restrict access to certain aspects of a customer account if the account is compromised. The service provider may restrict access using a variety of methods. For instance, in an embodiment, the service provider may apply a policy mask that supersedes one or more existing customer policies in the account, such as any policies in conflict with the policies of the policy mask. The policy mask may comprise a set of policies that are applied so as to not alter any customer policies in place in an account but would rather disable certain policies until the customer takes remedial actions to address the compromised state of the account.

In various embodiments, the computing resource service provider may develop a behavior model for each customer account for the purpose of determining whether requests are submitted in accordance with the customer's typical behavioral pattern or whether the requests are anomalous and, therefore, more likely to be the result of malicious intentions. For instance, developing the behavior model may include examining customer logs to determine a pattern of activity that the customer would use in the normal operation of the account. A behavior model is one that may include a list of functions that are indicative of abnormal activity and would not be taken by a customer. Thus, the behavior model may be utilized as a method for detecting whether an account has been compromised or as a way to prevent certain account activity. Generally, a behavior model may be any representation of customer behavior that is usable to determine whether a request is anomalous.

In an embodiment, the computing resource service provider may utilize both a policy mask and a behavior model to determine what data may be accessed in a compromised account. As noted above, a policy mask may be used to disable certain customer policies in the account until the customer has taken remedial steps to ensure the security of the account. This may include disabling certain administrative policies, preventing unauthorized third parties from making administrative changes to the account. In conjunction with a policy mask, a behavior model may be used to determine whether a request for access in the account is anomalous in nature. For instance, after a policy mask has been applied to disable certain administrative actions from being taken within a compromised account, a behavior model may be used in conjunction with one or more anomaly detection methods to analyze any other requests for access to the account to determine if the requests are anomalous based on past customer activity. If the request is anomalous in nature, the behavior model may be used to deny the request.

In this manner, a customer is able to access other aspects of an account while it is in a compromised state. In addition, the techniques described and suggested herein facilitate additional technical advantages. For example, because, in some embodiments, access to non-administrative actions in compromised accounts may be permitted, a customer relying on various data within the account can continue to access the data without any additional significant latency resulting from the compromised state of the account. This, in turn, may reduce the cost of any downtime, particularly for a customer that provides data within the account to other entities in a time-sensitive manner. Additional uses are also enabled by the various techniques described herein.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource hardware may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an organization that could utilize the various services through one or more user accounts associated with the organization. Additionally, the customer 104 may be an individual that could utilize the various services through a personal account. The customer 104 of the computing resource service provider 102 may utilize various services provided by the computing resource service provider 102. For example, the customer 104 may utilize the services provided by the computing resource service provider 102 through automated processes, such as batch requests made to a service or customer server requests that require access to the service to support a customer operation. As illustrated in FIG. 1, the customer 104 may access an account through administrative 106 and non-administrative 108 requests. An administrative request 106 may be, for example, one in which the customer seeks to change or update various authorization credentials within the account. Additionally, a customer 104 may make an administrative request 106 to delegate certain authorizations to a host of delegate users of the account. For example, additional users of the account may be employees of the customer 104 that require access to the account to perform various duties for the customer 104. Additionally, users of the account may include clients of the customer 104 that may be paying fees to the customer 104 for access to the account. A customer 104 may also make an administrative request 106 to re-organize any information that is contained in the account. Non-administrative requests 108 may, but do not necessarily, include read access to any data contained within the account and write access to non-sensitive data such as audio files or pictures.

The customer 104, if the account is not in a compromised state, may have the ability to determine what actions are permitted in the account should it become compromised. For example, the customer 104 may have the ability (e.g., through an account management console or proper API call) to determine what actions are to be considered administrative for the purpose of account management on behalf of the computing resource service provider 102 if the account has been compromised 110. In another example, the customer 104 may determine whether, as noted below, the computing resource service provider 102 may apply a behavior model with various anomaly detection methods to the compromised account 110. Additionally, the customer 104 may determine what restrictions may be applied to the compromised account 110 over time (e.g., reduction in bandwidth if no action is taken to remove the account from a compromised state).

At any time, the computing resource service provider 102 may detect that the customer 104 account has been compromised 110. The computing resource service provider 102 may make this determination through the use of a variety of techniques. For instance, as noted above, the computing resource service provider 102 may refer to data contained in public Internet repositories of data and, upon a discovery of customer 104 credentials, determine the account has been compromised 110. Additionally, a computing resource service provider 102 may receive information from the customer 104 indicating that customer credentials have been compromised resulting in a compromised account 110. Alternatively, a computing resource service provider 102 may determine an account has been compromised based on anomalous activity in the account. For example, if a computing resource service provider 102 detects that requests made to an account were made by users using an unfamiliar Internet protocol (IP) address (i.e., an IP address from which requests have not been previously received) corresponding to a foreign country from which requests are not typically received, the computing resource service provider 102 may determine that this is anomalous behavior and deem the account to be compromised.

Accordingly, as illustrated in FIG. 1, the computing resource service provider 102 may restrict administrative requests 106 to access a compromised account 110. For instance, as noted above, a computing resource service provider 102 may restrict administrative requests 106 by applying a policy mask that supersedes any conflicting customer 104 policies that may exist in the compromised account 110. This policy mask may continue to be applied to the compromised account 110 until the customer 104 takes remedial actions to secure the account, such as changing any authorization credentials or eliminating unauthorized user accounts.

Figure 2:
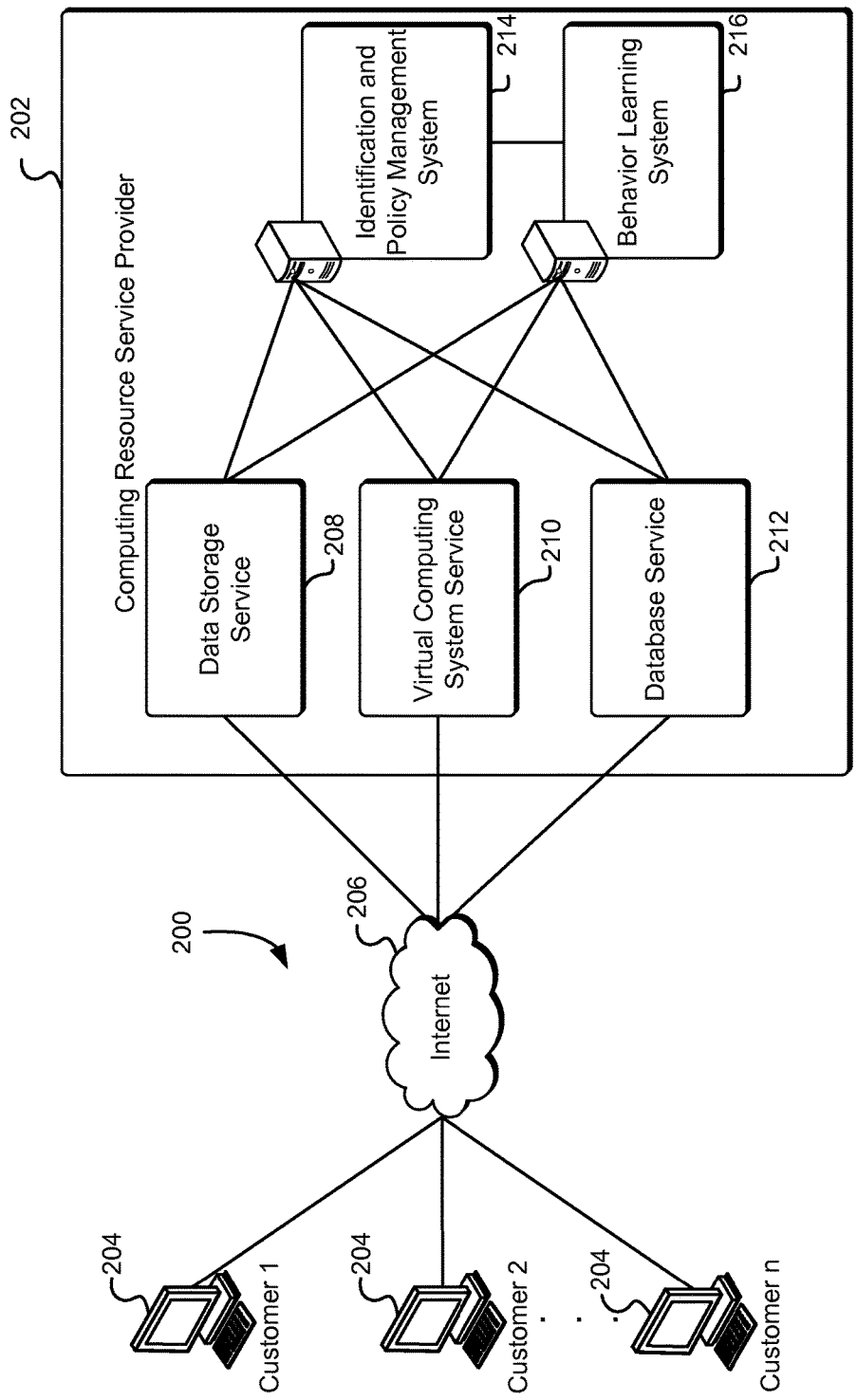
FIG. 2 shows an illustrative example of an environment in which various embodiments can be implemented.

FIG. 2 shows an illustrated example of an environment 200 in which various embodiments of the present disclosure may be practiced. The environment 200 illustrated in FIG. 2 may include components such as those described above in connection with FIG. 1. For example, the environment 200 in FIG. 2 includes a computing resource service provider 202 and a variety of customers 204. The computing resource service provider 202 and customers 204 may be configured such as described above in connection with FIG. 1. As illustrated in FIG. 2, the customers 204 may communicate with the computing resource service provider 202 through one or more communications networks, such as the Internet 206. Some communications from the customers 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least three services. The services 208 provided by the computing resource service provider, in this example, include a data storage service 208, a virtual computing system service 210 and a database service 212, although not all embodiments of the present disclosure will include all such services and additional services may be provided in addition to or as an alternative to services explicitly described herein.

The data storage service 208 may comprise a collection of computing resources that collectively operate to store data for customers 204. The data stored by the data storage service 208 may be organized into data objects. The data objects may have arbitrary sizes except, perhaps, for certain constraints on size. Thus, the data storage service may store numerous data objects of varying sizes. The data storage service 208 may operate as a key value store that associates data objects with identifiers of the data objects which may be used by the customer 204 to retrieve or perform other operations in connection with the data objects stored by the data storage service 208. Access to the data storage service may be through appropriately configured API calls.

The virtual computing system service 210 may be a collection of computing resources configured to host virtual computing systems for customers 204 of the computing resource service provider 202. Customers 204 of the computing resource service provider 202 may interact with the virtual computer systems' service to provision and operate virtual computer systems that are hosted on physical computing devices operated by the computing resource service provider 202. The virtual computer systems may be used for various purposes, such as to operate as servers supporting a website.

The database service 212 may be a collection of computing resources that collectively operate to run one or more databases for one or more customers 204. Customers 204 of the computing resource service provider 202 may operate and manage a database from the database service 212 by utilizing appropriately configured API calls. This, in turn, may allow a customer 204 to maintain and potentially scale the operations in the database.

Each customer 204 may request access to their respective service accounts to utilize the services provided by the computing resource service provider 202. The computing resource service provider 202 may utilize an identification and policy management system to determine whether a customer 204 account has been compromised. As illustrated above in connection with FIG. 1, if a customer account has been compromised, the computing resource service provider 202 may restrict administrative access to the customer account. The identification and policy management system 214 may obtain information from outside sources, such as public Internet repositories of data, to determine if customer credentials have been made public and thus are compromised. Additionally, the identification and policy management system 214 may receive a notification from a customer 204 that the account credentials have been compromised. If the customer account has been compromised, the identification and policy management system 214 may apply a policy mask, as noted above, to restrict administrative access to any services 208 the customer 204 may utilize. This policy mask would continue to be implemented until the customer 204 takes certain remedial actions, such as changing account authorization credentials, to address the compromised state of the account. This policy mask, however, may not affect any non-administrative requests made by a customer 204 and thus enable a customer 204 to access some aspects of the services provided by the computing resource service provider 202.

In addition to using one or more identification and policy management systems 214, the computing resource service provider may implement one or more behavior learning systems 216 to determine, among other things, typical customer 204 account behavior. For instance, a behavior learning system 216 may be used to determine typical account behavior by examining customer 204 logs detailing prior activity in the customer account. Alternatively, a behavior learning system 216 may determine typical account behavior by continuously evaluating each customer 204 action as it occurs in real time. Based on the customer account behavior, the behavior learning system may generate a customer 204 behavior model that could be used in conjunction to one or more anomaly detection methods to determine whether a customer 204 request to access an account is in accordance with typical customer requests or is, according to the model, an anomaly. This model may be updated each time the customer 204 generates a request to access any accounts in the services 208 provided by the computing resource service provider 202. This, in turn, would enable the behavior learning systems 216 to generate a robust behavior model for each customer 204.

As noted above, if a customer 204 account has been compromised, the identification and policy management system 214 may apply a policy mask to the compromised account in order to restrict administrative access to the account. In addition to restrictions applied to administrative requests through the use of a policy mask, the behavior learning system 216 may be utilized to restrict other forms of access to the account. For instance, if the identification and policy management systems 214 determine that an account has been compromised, it may apply a behavior model generated using the behavior learning system 216, along with one or more anomaly detection methods, to determine whether any customer 204 requests conform to the behavior model. If a customer 204 request does not conform to the behavior model such that it is anomalous, the computing resource service provider 202 may deny the customer 204 request to access the account.

Figure 3:
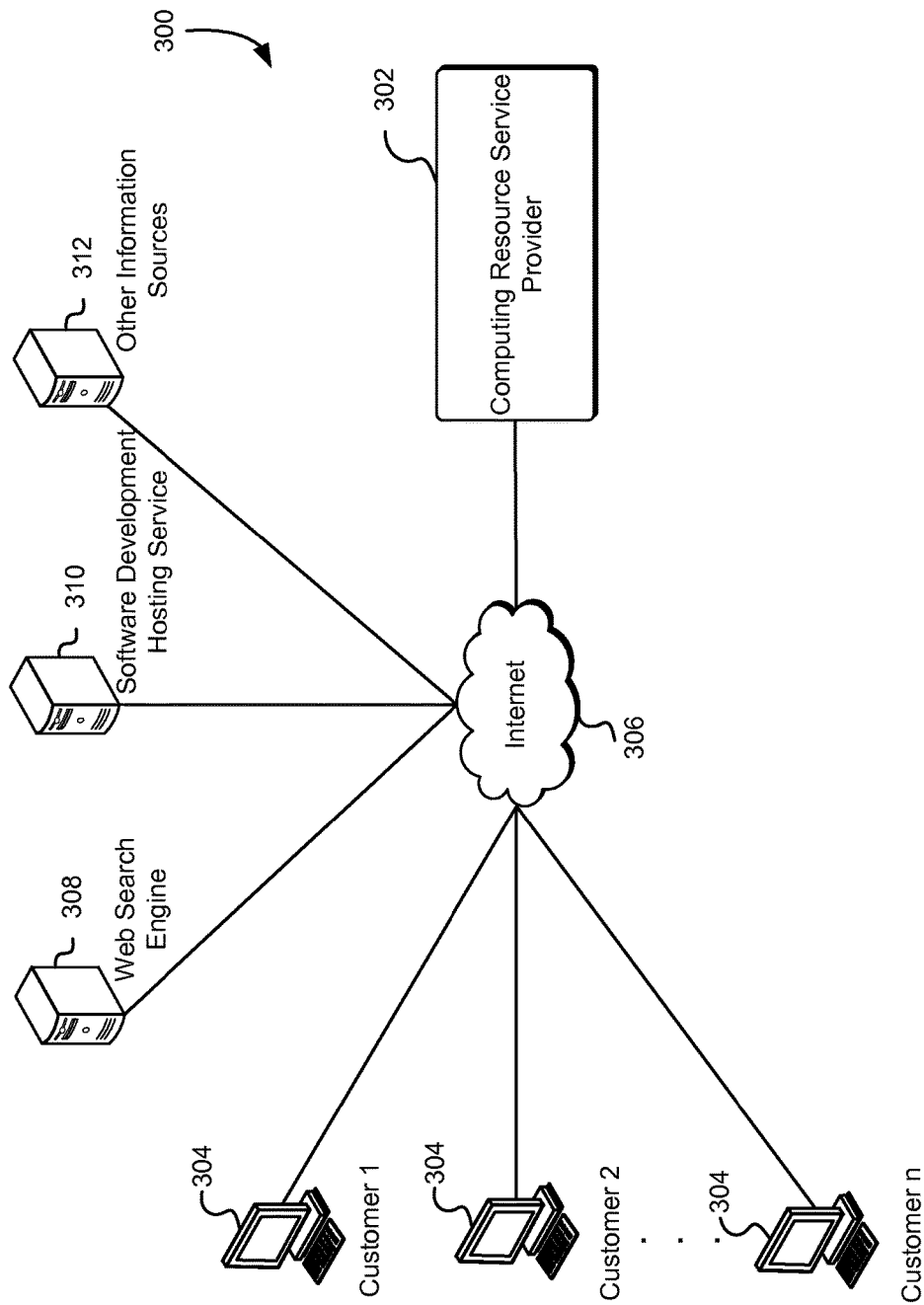
FIG. 3 shows an illustrative example of an environment in which various embodiments can be implemented.

FIG. 3 shows an illustrative example of an environment 300 for determining whether a customer account has been compromised in accordance with an embodiment. As illustrated in FIGS. 1 and 2, the computing resource service provider 302 may receive administrative and non-administrative requests from a variety of customers 304 to access a variety of services provided by the computing resource service provider 302. These requests may be transmitted over one or more networks such as the Internet 306. Concurrently, the computing resource service provider may examine a variety of public Internet repositories of data to determine if customer credentials have been made public and thus compromising the customer account. The public Internet repositories of data may include, as illustrated in FIG. 3, but are not limited to, a web search engine 308, a software development hosting service 310, and other information sources 312.

A web search engine 308 consists of software integrated into a variety of computer systems which serve to obtain information from the Internet 306. The search engine 308 may be configured such that one or more computer systems may store a cache of information for each web page on the Internet to simplify a search query made by a user of the search engine. The cache of information may include, but is not limited to, the title of a web page, certain content within a page, and page headings. This cache is then indexed in a database maintained in the computer systems maintained by a search engine service provider. Thus, when a user submits a query to the web search engine 308, the engine 308 will examine the indexes and generate, on a search results page, a list of web sites that best satisfy the query. The search results page may include a short statement detailing the contents of each web site listed and thus enable a user to quickly determine if any site meets his or her needs. In the context of an embodiment, the computing resource service provider 302 may utilize a web search engine 308 in order to determine if any customer account credentials have been compromised. For example, if a customer account credential consists of a string of characters, which may contain a specific set of characters, the computing resource service provider 302 may submit a query to the web search engine 308 that may generate a list of web sites that have strings matching those used as account credentials. The computing resource service provider 302 may then examine these sites in greater detail to determine if the found strings are in fact customer account credentials and, if they are, flag the account as being compromised and notify the specific customer 304 of the issue. Additionally, the computing resource service provider 302 may examine the short statements detailing the contents of each web site listed in the results page. Web search engines 308 may provide a computing resource service provider 302 with archived versions of the websites contained in the cache. Additionally, web search engines 308 may provide an API to a computing resource service provider 302 to allow the use of automated methods for extracting information from the web search engine 308 results and cache.

Software development hosting services 310 enable users to collaboratively develop software with other users of the service 310. The software that is developed by the users of the service 310 may be maintained on one or more servers that are connected to the Internet 306. A user of the software development hosting services 310 may also be a customer 304 of the computing resource service provider 302. This may present various issues for the computing resource service provider 302. For example, if a customer 304 of the computing resource service provider 302 encodes the software with tools that are used to access data within the customer account, the source code for that software may contain customer account credentials. Thus, a third party examining the source code may obtain account credentials and have access to administrative actions within the account. Additionally, the software generated through a software development hosting service 310 may be open source (e.g., distributed freely with unfettered access) and thus the source code may be viewed by any entity. A computing resource service provider 302 may thus determine that an account is compromised by examining any software created using a software development hosting service 310 and that has been released to the public (or has otherwise become available) and finding a specific string that contains account credentials. Additionally, a computing resource service provider 302 may create an account within the software development hosting service 310 and, through an appropriately configured API call, search for a specific string of characters within all open source software source code. If a specific string of characters is found within the software development hosting service 310, the computing resource service provider 302 may determine that an account is compromised.

A computing resource service provider 302 may determine that an account is compromised by examining other information sources 312. For example, electronic mail service providers may notify a computing resource service provider 302 that customer accounts may have been compromised as a result of phishing attacks (e.g., third parties may send electronic mail to a variety of users wherein the third party is impersonating a trusted entity). Additionally, a customer that uses an electronic mail service may notify the computing resource service provider 302 if the electronic mail service account has been compromised. Another example is one in which unrelated web sites have a security breach resulting in all the customer credentials on those sites being compromised. In this instance, the computing resource service provider 302 may obtain all the account names and credentials from the compromised web sites and compare them to the account names and credentials used to gain access to the services provided by the computing resource service provider 302. If the account name and associated credentials produce a match, the computing resource service provider 302 may determine that the account has been compromised and notify the affected customer.

Figure 4:
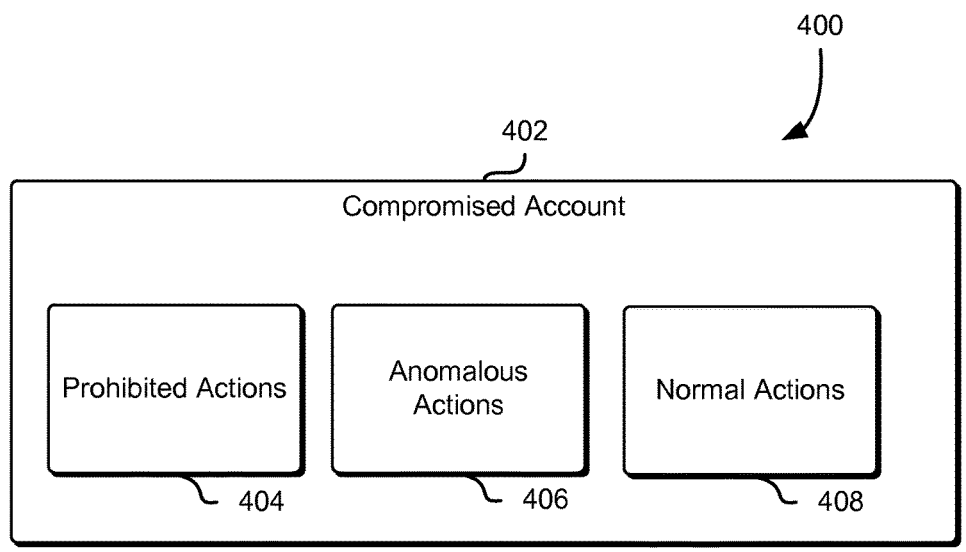
FIG. 4 shows an illustrative example of various actions that may be taken in a compromised account.

As noted above, if an account is compromised, the computing resource service provider may prevent a customer from invoking certain actions within an account. Accordingly, FIG. 4 is an illustrative representation 400 example of an account where potentially performable actions are characterized into various categories such that certain actions may be taken within a compromised account in accordance with at least one embodiment. As illustrated in FIG. 3, a computing resource service provider may determine that an account 402 compromise account is in a compromised state by referring to data contained in public Internet repositories of data and discovering customer credentials in these repositories. If a compromised account 402 exists, the computing resource service provider may generate a set of prohibited actions 404 that a customer would not be permitted to execute until the account 402 is no longer in a compromised state. An example of a prohibited action 404 is one that would enable an entity to effect changes to any account credentials. Another example of a prohibited action 404 is one that would allow an entity apart from the computing resource service provider to modify any administrative rights within the compromised account 404. Administrative rights may include the ability to delete any data contained within an account, modify account permissions for other delegated users of the account and reorganize the data structure within the account.

A computing resource service provider may utilize a policy mask to prevent the set of prohibited actions 404 from being executed within a compromised account 402. As noted above, a customer may have certain policies in place within an account to execute any actions that are received by a user of the account in a prescribed manner. In a compromised account 402, a policy mask may be applied over a set of customer policies such that no prohibited actions 404 may be taken by any user of the account. The application of the policy mask may not overwrite any existing customer account policies but may supersede existing customer policies and would remain in place so long as the account remains compromised. The policy mask may be applied utilizing an identification and policy management system as illustrated in FIG. 2.

If an account 402 does exist in a compromised state, the computing resource service provider may additionally address any anomalous actions 406 that are requested by a user of the compromised account 402. An example of an anomalous action 406 is one that is anomalous with respect to previous actions made in connection with the account. For instance, a user of an account may not usually transfer or copy all data within the account to an Internet protocol (IP) address associated with illicit activity or rogue actors. Additionally, a user of the account may not usually seek to delete all data within an account, particularly if the customer of the computing resource service provider is utilizing the account to provide data to a variety of users.

To determine what would constitute an anomalous action 406 within a compromised account 402, a computing resource service provider may utilize a behavior learning system as illustrated in FIG. 2. The behavior learning system may utilize customer logs which detail user activity within the account each time the account has been accessed. Additionally, the behavior learning system may be configured to identify and prevent actions that are inherently suspect but not necessarily prohibited, such as described below. An example of such an action, as noted above, is one in which a user requests the deletion of all data within the account. The behavior learning system may use the information obtained through the customer logs to generate a customer behavior model specific to each account within the computing resource service. Additionally, the behavior learning system may maintain and utilize a behavior model that is not necessarily specific to the customer. For example, the behavior model may be based at least in part on customer logs from a plurality of customers which may or may not include the customer. In some examples, if the customer belongs to a class of customers, the computing resource service provider may apply a behavior model tailored from customer logs of those customers belonging to the same class. The behavior model may also be generated to identify requests that fall into categories of inherently suspect behavior, where the categories may be determined by human operators. If the account 402 exists in a compromised state, the computing resource service provider may apply the customer behavior model specific to that account and a behavior model based on a class of customers, in conjunction with one or more anomaly detection methods (e.g., cluster analysis, Markov chains), to deny any anomalous actions 406 from taking place in the account.

Normal actions 408 that are to be taken within a compromised account 402 that are not considered anomalous and are not part of the set of prohibited actions 408 may be processed in due course. Normal actions 408 include those actions that may not have a negative impact on the compromised account 402 and, depending on the policy mask, customer behavior model and anomaly detection methods applied to the compromised account 402, may be limited to a few actions. For example, a normal action 408 may be one in which a user requests read access to an audio file within the customer account, such as for audio streaming. Another example of a normal action 408 may be one in which a user requests modification of data within the account that is accessed frequently.

Figure 5:
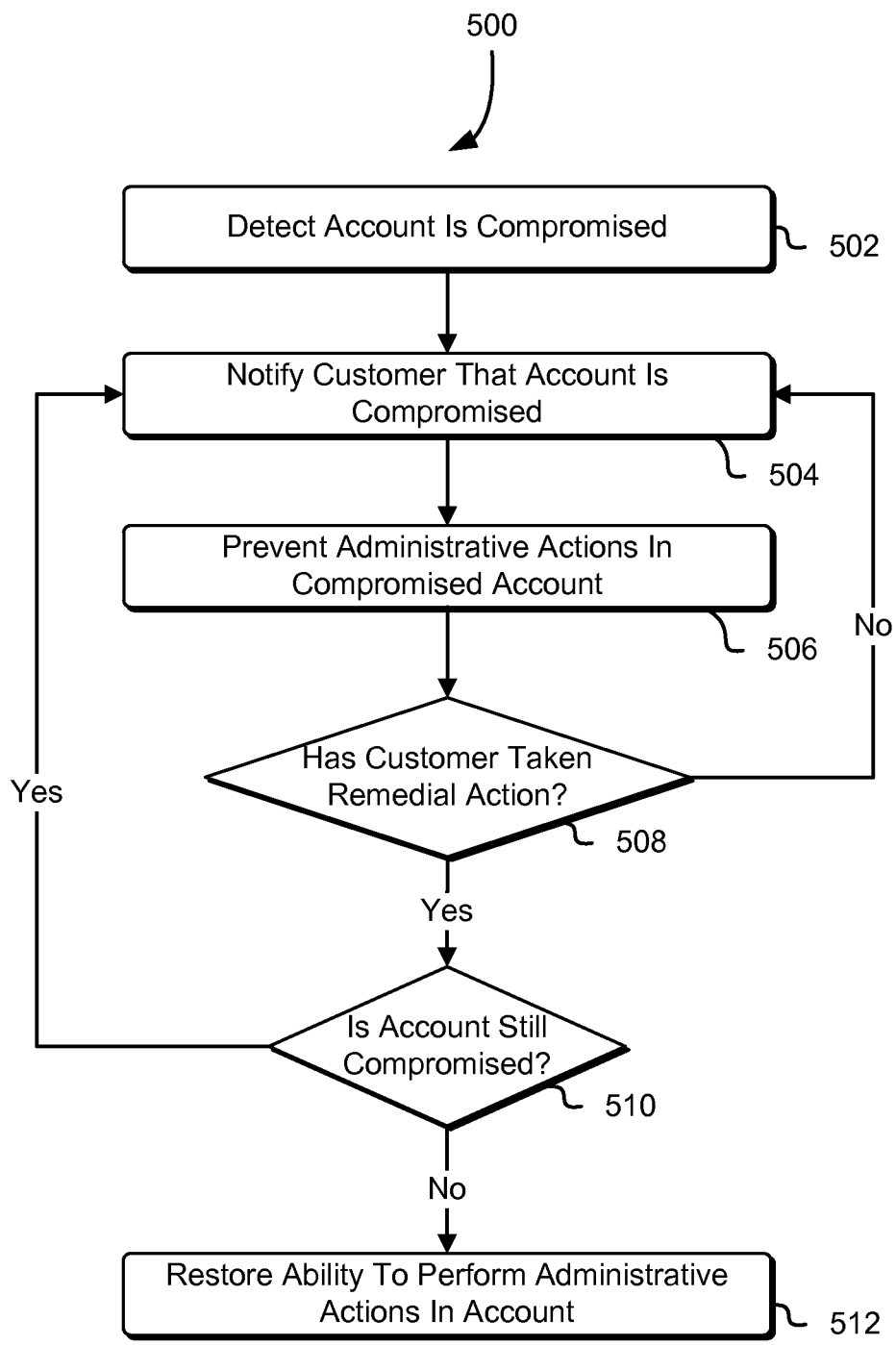
FIG. 5 shows an illustrative example of a process for preventing certain actions in accordance with at least one embodiment.

As discussed above, a computing resource service provider may restrict administrative actions in an account that has been compromised. Accordingly, FIG. 5 shows an illustrative example of a process 500 for restricting administrative actions within an account in accordance with an embodiment. The process 500 illustrated in FIG. 5 and variations thereof may be performed by any suitable system, including an identification and policy management system, such as described above, to restrict certain actions in a compromised account. In various embodiments the process 500 includes detecting 502 that a customer account has been compromised. This detection may be made in various ways. For example, as illustrated in FIG. 3, a computing resource service provider may search for customer account credentials in public Internet repositories of data such as, but not limited to, web search engines, software development hosting services and other information sources. Additionally, the computing resource service provider may receive information from a customer that the account has been compromised. Accordingly, upon detection that the account has been compromised, the computing resource service provider may flag the account, which may include associating, in a data store, the account with a compromised state.

Upon detecting 502 that the customer account has been compromised, the process 500 may include notifying 504 the customer that the account has been compromised. A notification may be made, for example, through the delivery of an electronic mail message to an electronic mail account associated with the customer informing the customer that the account has been compromised. Other messaging systems may be used in addition to or as an alternative to electronic mail. The message may include a list of remedial steps that the customer must follow in order to restore certain rights in the account. For instance, the customer may be required to change all account credentials and remove or deauthorize any suspect users from the account prior to a restoration of account rights. Additionally, the customer may be given a specified time limit to perform the necessary steps to restore the account rights or risk further restrictive measures or account removal. In addition to an electronic mail message, if the customer is using a graphical user interface (GUI) to interact with the account, the computing resource service provider may utilize a dialog box in the GUI to inform the customer that the account has been compromised. This may allow a computing resource service provider to require an acknowledgement from the customer that the account has been compromised prior to further access to the account. It is to be noted that the scope of the present disclosure is not necessarily limited to the use of electronic mail and dialog boxes explicitly noted herein.

Once the customer has been notified that the customer account has been compromised, the process 500 may include preventing 506 administrative actions from being taken in the compromised account. As noted above, administrative actions may fall under the category of prohibited actions that are immediately denied should a customer make a request to perform such an action. These prohibited actions may be restricted through, for example, the use of a policy mask. The policy mask may be, as noted above, a set of policies that would not alter any customer policies in place in an account but would rather supersede and thus disable certain policies until the customer takes remedial actions to address the compromised state of the account. As illustrated in FIG. 3, a policy mask may be applied using an identification and policy management system that is maintained by the computing resource service provider.

The process 500 may include preventing the customer from performing any administrative actions in the account until the customer has taken remedial action 508. As noted above, if an account is compromised, the computing resource service provider may notify 504 the customer that the account is compromised through the use of electronic mail, a dialog box within the GUI requiring customer acknowledgement of the issue or in any other suitable manner. The notification may contain a set of remedial steps the customer must take in order to remove the account from a compromised state. If the customer has not taken the necessary steps to remove the account from a compromised state, the computing resource service provider may, after a period of time to allow for taking remedial measures, send another notification 504 to the customer that the account is compromised and continue to prevent 506 any administrative actions from being taken within the account. As noted above, the customer may be given a specified time limit to perform the remedial actions to restore the account rights or risk further restrictive measures or account removal. Further restrictive measures may include a reduction in bandwidth within the service such that read and write operations are slowed down significantly. Additionally, the computing resource service provider may limit the number of non-administrative actions a customer may perform within a service until the customer has performed the remedial actions.

It should be noted that the customer, in order to take certain remedial actions 508, may need to have some administrative access to a compromised account. For instance, a remedial action that may need to be taken by a customer is one that would require a change to the customer's credentials or the credentials of a delegated user. In order to prevent unauthorized administrative actions from being taken by a third party, the computing resource service provider may invoke additional safeguards to ensure that a customer or delegate user is authorized to perform the necessary administrative remedial actions. For example, the computing resource service provider may require additional evidence for authentication (e.g., answer an additional security question, enter a pin number transmitted to a cellular device at certain time intervals, etc.). Additionally, the computing resource service provider may require that only the customer be permitted to change a delegate user's credentials rather than permitting the delegate user to perform the action independently.

Once the customer has taken remedial action to secure the compromised account, the process 500 may include having the computing resource service provider evaluate the account to determine 510 if the account is still compromised. For instance, if the customer was required to develop a new set of authorization credentials, the computing resource service provider may evaluate these new authorization credentials to determine if the credentials meet certain criteria. An example of an authorization credential criterion that may be used is one in which a password must contain a minimum number of alphanumeric characters, with at least one capital letter, and does not form a dictionary word. Another example of a criterion may require that the password not be a simple variation or a repetition of a password used in the past six months. If the new customer authorization credentials do not meet the specific criteria, the computing resource service provider may reject the new credentials and continue to prevent access as illustrated in FIG. 5, such as by maintaining an identification of the account as having been compromised and notifying the customer if sufficient new credentials are not provided in a certain time period.

A computing resource service provider may also determine 510 that a customer account is still compromised by analyzing the requests made by the customer and other users of the account. For instance, if the customer has taken remedial actions to secure the compromised account, but other delegated users of the account continue to make anomalous requests, the computing resource service provider may determine that the account is still compromised. In this instance, the computing resource service provider may again notify 504 the customer that the account is compromised and include new instructions to secure the account, such as removing any delegated users that are making anomalous requests and creating a new set of account credentials.

Once the account is deemed secured, the process 500 may include restoring 512 the ability to perform administrative actions in the customer account. In various embodiments, a customer must have taken certain remedial actions in order to secure the account. This may include changing all compromised credentials associated with the compromised account. Additionally, a compromised account may have a policy mask in place, overlapping any customer policies regarding any administrative actions to be taken in the account. If the account has been secured, the computing resource service provider may remove the policy mask and restore all customer policies to their original state.

Figure 6:
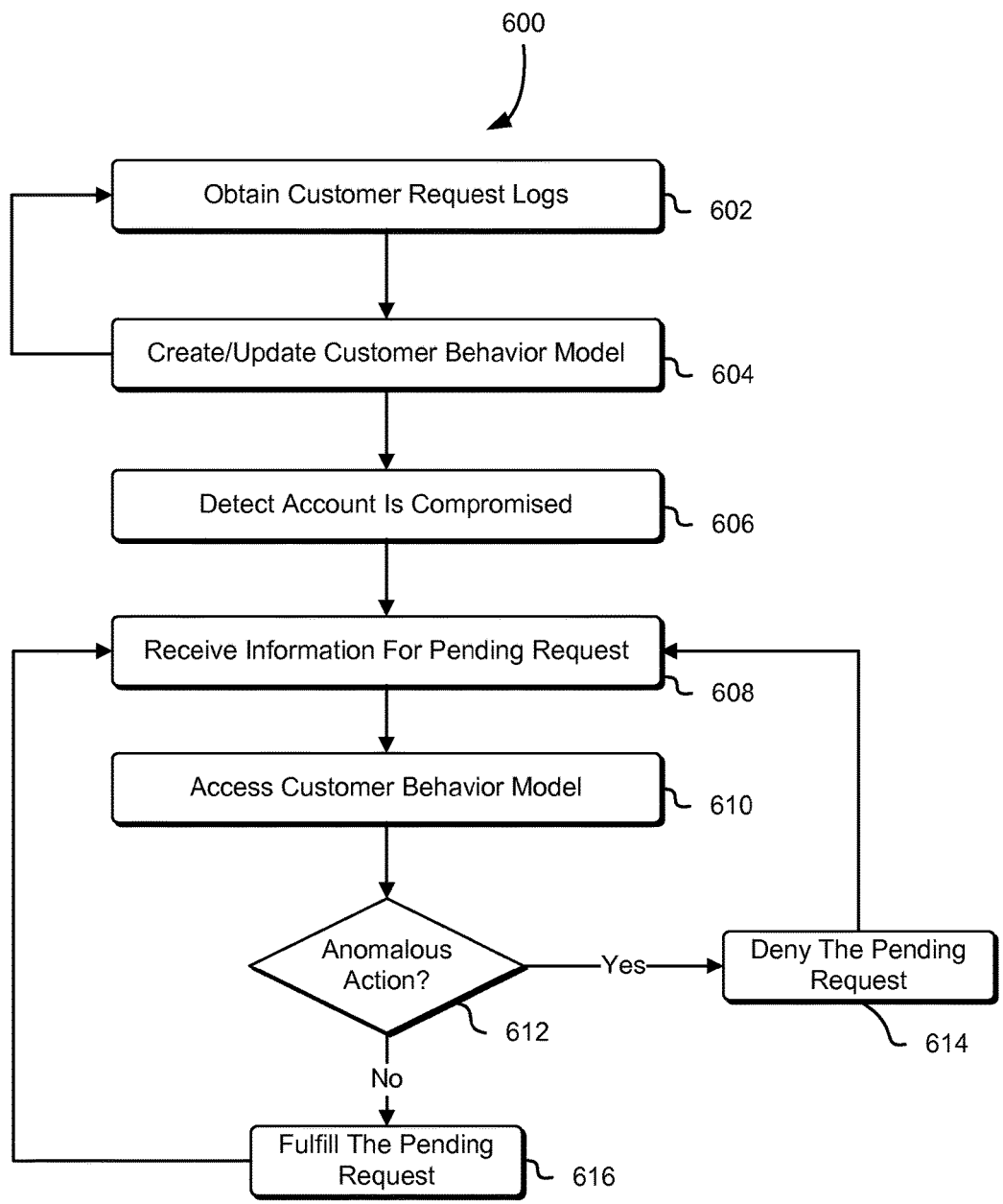
FIG. 6 shows an illustrative example of a process for applying behavior modeling to a compromised account in accordance with at least one embodiment.

As noted above, additional restrictions may be added to a compromised account. For instance, a computing resource service provider may apply a behavior model in conjunction with one or more anomaly detection methods to determine whether to deny any anomalous requests in a compromised account. Accordingly, FIG. 6 shows an illustrative example of a process 600 for applying a behavior model to a compromised account in accordance with an embodiment. The process 600 illustrated in FIG. 6 and variations thereof may be performed by any suitable system, including one that may utilize a behavior learning system to create a customer behavior model. In the process 600, a computing resource service provider may utilize a behavior learning system that obtains 602 customer request logs for evaluation. A customer request log may contain, for example, a list of requests and actions the customer has taken in a previous account session. For instance, a customer may use an account to read data, write data, delete data, and change the organization structure of the data within the account. Each of these actions, and generally some or all requests, may be recorded in the customer request log with additional relevant information, such as an identifier of a customer or delegated user who made the corresponding requests, a date/time for the requests, an originating IP for the request, information indicating whether requests were fulfilled or denied, reasons for denied requests and/or other information. The behavior learning system may evaluate the various customer request logs to determine a pattern of customer behavior within the account.

Once the behavior learning system has obtained the customer request logs, the behavior learning system may use these logs to generate 604 a customer behavior model. As noted above, the behavior learning system may evaluate the customer request logs to determine a pattern of behavior for the customer. For instance, a behavior learning system may utilize the customer request logs to categorize certain actions within the account. This categorization may be used to organize the actions taken in an account based on, for example, the frequency of the actions and any sequence of actions that may occur. As the customer and the delegate users access the account, the newly generated customer request logs may be used to update 604 the customer behavior model. The action of continuously updating the customer behavior model may lead to a more robust definition of the customer pattern of behavior and thus enable improved predictions of normal account behavior. Additionally, based on the pattern of behavior for the customer, the behavior learning system may generate a policy mask tailored to override certain customer policies. The policy mask may be applied, such as described above.

The customer behavior model may continuously be updated using the customer request logs until the account is determined to be compromised. Accordingly, the process 600 includes detecting 606 whether an account has been compromised. As noted above, a computing resource service provider may perform a search in public Internet repositories of data to determine whether any customer credentials have been compromised through inadvertent or intentional public disclosure. Additionally, a customer may notify the computing resource service provider that the account has been compromised through the inadvertent or intentional disclosure of customer credentials to a third party or the general public. If the account has been compromised, the computing resource service provider may restrict any administrative actions and any other prohibited actions as defined above. However, as illustrated in FIG. 4, any actions that are not deemed prohibited may be processed further using the customer behavior model.

Once a customer account has been deemed compromised, the computing resource service provider may scrutinize any pending customer and user requests to perform one or more actions within the account. As illustrated in FIG. 4, any request to perform a prohibited action is automatically denied; all other requests are further scrutinized using, for example, a customer behavior model, in addition to a behavior model based on a class of customers, and one or more anomaly detection methods. Accordingly, the process 600 includes receiving 608 information regarding any pending request to perform an action within the account that has not been deemed a prohibited action. For example, a customer may send a request to read a data object from the data storage service provided by the computer resource service provider. The account within the data storage service has been compromised and as such no administrative actions are permitted. In this instance, the requested action is not an administrative action and the data storage service may thus collect information regarding the pending request and send the information to the behavior learning system for processing.

The behavior learning system, upon receiving 608 the information for the pending request, may access 610 the customer behavior model, in addition to a behavior model based on a class of customers, in order to analyze the request. As noted above, the customer behavior model may be created by evaluating past customer request logs and determining a pattern of behavior for the customer and any delegate users that may access the account on a routine basis. Additionally, as the customer and any delegate users access the account, the behavior model may be updated to ensure a robust model capable of predicting typical customer and user behavior. The behavior model may thus be used in this instance to determine whether the request is one that is in accordance with typical customer or user behavior.

As illustrated in FIG. 4, an action that is not defined as a prohibited action may be either an anomalous action or a normal action. The behavior learning system may use the behavior model in the process 600 in conjunction with one or more anomaly detection methods to determine whether a request to perform an action within an account is anomalous 612 or normal in nature. Generally, one or more machine learning techniques may be used to generate a model of the customer behavior and the model can be used to determine whether particular requests are typical according to the model. An example of an anomaly detection method is one that utilizes cluster analysis to identify whether a requested action is anomalous. In the case of cluster analysis, a set of algorithms may be implemented to examine the behavior model to determine if a requested action or set of actions is within a cluster of actions deemed to be normal. If a requested action or actions are outside of the cluster as defined, the action or actions may be deemed to be outliers and thus anomalous. Another example of an anomaly detection method is the use of Markov chains to determine the probability of an action or set of actions based on an initial customer action in an account or any subsequent actions. If the set of actions requested by a customer continually have a low probability of occurring within a Markov chain, then it may also be deemed to be anomalous.

If the request made by a customer or user is deemed to be anomalous, the computing resource service provider may deny 614 the request. For example, the behavior learning system may utilize the customer behavior model, a behavior model based on a set of customer logs from a plurality of customers, and an anomaly detection method to examine the request and determine that the action or actions requested are not in conformity with the model. In turn, the behavior learning system may deliver a signal to the requested service indicating that the request is anomalous in nature. Thus, the requested service may notify the customer or user of the account that the request has been denied. If a request to perform an action is in conformity with a behavior model, the request may be fulfilled 616. In either instance, the process 600 may evaluate all pending requests and may determine which requests to fulfill or deny based on the customer behavior model, the behavior model based on a class of customers, and the anomaly detection methods employed.

As noted above, a customer may be required to perform a number of remedial actions to remove an account from a compromised state. In some instances, a request to perform a remedial action may be one that would normally be considered anomalous and thus would generally be denied. Thus, the computing resource service provider may permit certain anomalous actions. In order to ensure that only an authorized user of the compromised account is performing these specific anomalous remedial actions, the computing resource service provider may require additional evidence for authentication (e.g., answer an additional security question, enter a personal identification number (PIN) transmitted to a cellular device at certain time intervals, etc.). Additionally, the computing resource service provider may limit access to these anomalous remedial actions to only the customer and not the delegate users of the account. Other variations of the process 600 and other processes described herein are considered as being within the scope of the present disclosure. For example, as noted above, a behavior model used to determine whether requests associated with a comprised account should be fulfilled or denied is, in some embodiments, not necessarily customer specific. Accordingly, the process 600 may be adapted to utilize behavior models that are not customer specific in addition to or as an alternative to the customer behavior model discussed above in connection with FIG. 6.

Figure 7:
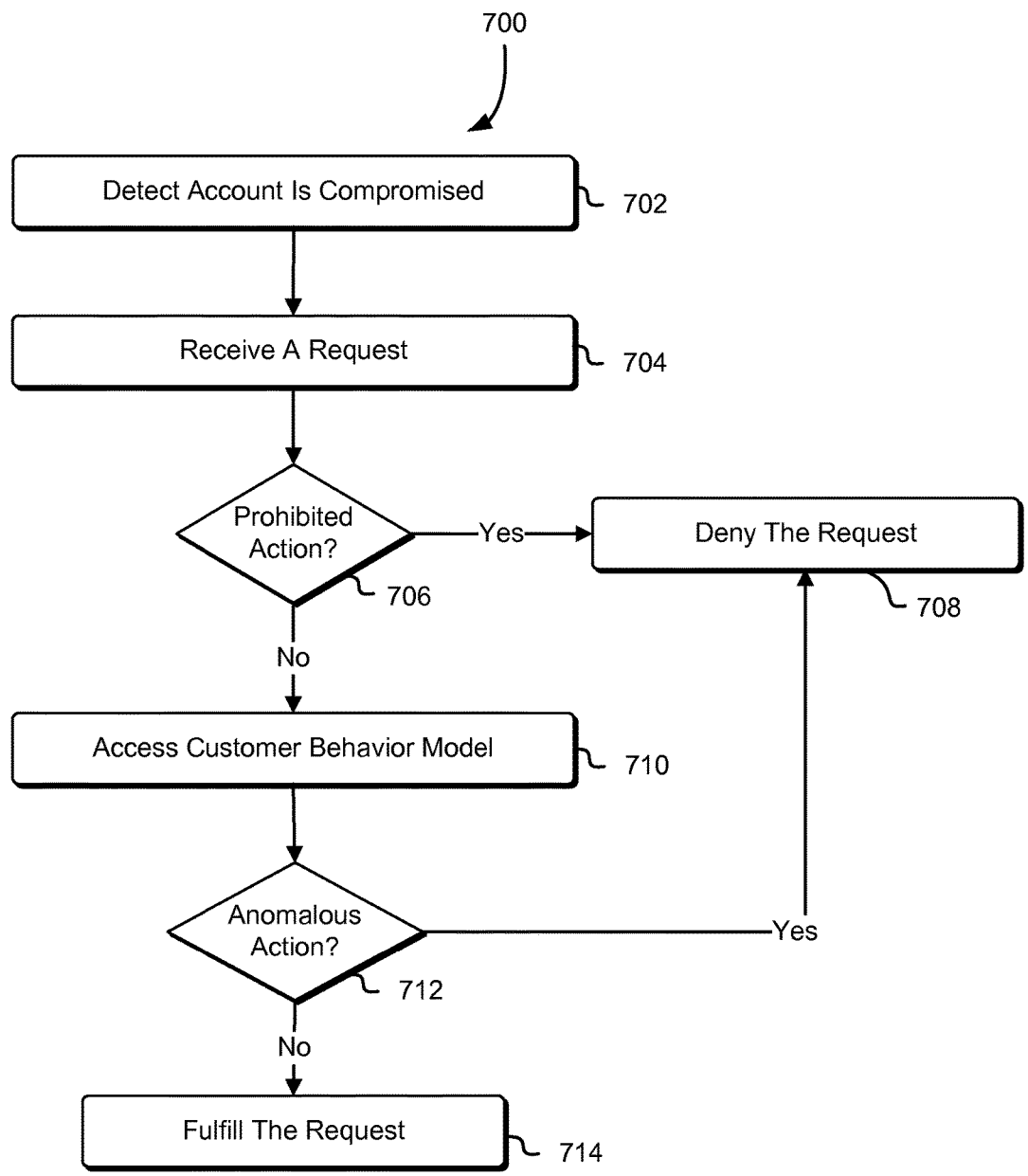
FIG. 7 shows an illustrative example of a process for processing a customer request in accordance with at least one embodiment.

FIG. 7 is an illustrative example of a process 700 for processing a customer request to perform one or more actions in an account in accordance with at least one embodiment. As noted above, a computing resource service provider may restrict certain actions in an account if the account has been compromised. Thus, the process 700 may detect 702 whether an account has been compromised. As illustrated in FIG. 3, the computing resource service provider may search through various public Internet repositories of data such as, but not limited to, web search engines, electronic mail service providers, and software development hosting services to determine if customer credentials have been made public and thus compromising the customer account. Additionally, a customer may notify the computing resource service provider and inform the service provider that the account credentials have been compromised either through the intentional or unintentional disclosure of the credentials to the public or an unauthorized party. In this fashion, the computing resource service provider may determine that the account has been compromised and restrict any administrative actions in the account. Additionally, the computing resource provider may notify the customer that the account has been compromised and provide a set of remedial actions that must be taken in order to secure the account.

At any point after the computing resource service provider has determined that an account has been compromised, a customer or a set of delegated users may attempt to submit a request to access the account. The process 700 may receive 704 this request and, through the use of, for example, an identification and policy management system, determine whether the request should be processed further. For instance, as illustrated in FIG. 4, a customer or any delegated user may request access to an account to perform a series of actions that may be characterized as prohibited actions, anomalous actions or normal actions. The computing resource service provider may or may not process a request based on the type of action that is requested by the customer or delegated user.

A prohibited action, as noted above, may be one that would enable a customer or a delegated user to effect changes to any account credentials. Additionally, a prohibited action may be one that that would allow a customer or a delegated user to modify any administrative rights within a compromised account. The process 700 may evaluate the received request to determine 706 if the requested action is one that may be considered prohibited. If the customer or delegated user is seeking to perform a prohibited action in the account, the process 700 may subsequently deny 708 the request. However, if the customer or delegated user is seeking to perform an action that is not classified as being a prohibited action, the process 700 may further evaluate the requested actions to determine whether the request should be fulfilled.

As noted above, the computing resource service provider may generate a customer behavior model by evaluating prior customer requests and delegated user logs to determine a pattern of behavior for the customer and delegated users. The computing resource service provider may utilize a behavior learning system to generate the customer behavior model. The computing resource service provider may access 710 the customer behavior model (and/or another behavior model) should a request not include any prohibited actions as defined above. Applying one or more anomaly detection methods, such as the use of cluster analysis or Markov chains to detect a statistical anomaly, in conjunction with the customer behavior model, the process 700 may include determining 712, using the accessed behavior model(s), whether a requested action is anomalous in nature. If the action is determined to be anomalous, the process 700 may include denying 708 the request. However, if a request to perform an action is in conformity with a customer behavior model, the process 700 may include fulfilling 714 the request.

Figure 8:
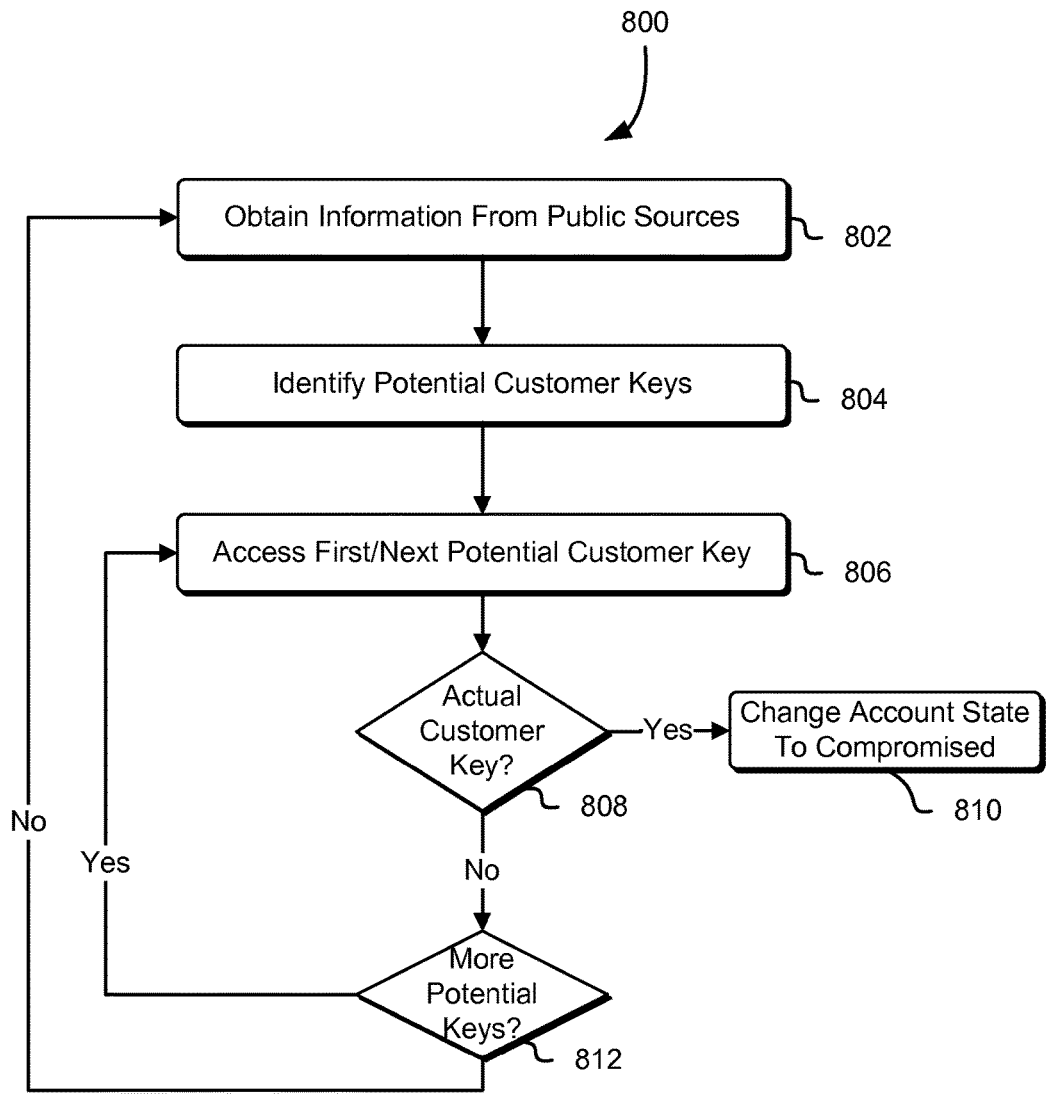
FIG. 8 shows an illustrative example of a process for determining whether an account is compromised in accordance with at least one embodiment.

FIG. 8 is an illustrative example of a process 800 for determining whether customer account credentials have been compromised in accordance with at least one embodiment. As noted above, a computing resource service provider may obtain 802 information from public sources, including from public Internet repositories of data, as part of an ongoing process to determine if any customer accounts have been compromised. As illustrated in FIG. 3, public Internet repositories of data may include, but are not limited to, web search engines, electronic mail service providers and software development hosting services. The information garnered from these sources may include, for example, web pages utilizing HyperText Markup Language (HTML), source code for software packages and electronic mail messages.

Customer authorization keys may consist of a string of characters that may be recognized by the computing resource service provider. Thus, the customer authorization key may serve as a credential for the customer and required to access an account provided by the computing resource service provider. Accordingly, the process 800 includes identifying 804 potential customer authorization keys from the information garnered from the public Internet repositories of data. The computing resource service provider may utilize, for example, one or more cryptographic protocols to develop an authorization key for each customer utilizing a service provided by the service provider. The cryptographic protocols may use a variety of algorithms to generate a string of characters that form the authorization keys. The computing resource service provider may, for example, use a computer system programmed with various algorithms to search for potential authorization keys among the information garnered from the public Internet repositories of data. The algorithms may include instructions to search for character strings that have characteristics (e.g., length) that match the characteristics of keys generated by the computing resource service provider. Additionally, the computer resource service provider may utilize more advanced searching techniques to search for potential authorization keys. For example, the computer resource service provider may search for potential authorization keys by not only searching for a string of characters that may form an authorization key but also key words that may be in close proximity to the string of characters. For instance, the computing resource service provider may search for a string of characters that resembles an authorization key and certain words or roots of words, such as "credential," "password," "key" and/or others in a specified proximity to the string of characters. Another example is one in which the computing resource service provider identifies a segment of source code relating to authorization function calls, such as source code containing a uniform resource locator (URL) and/or IP address for a web service interface of a provider, and performs a search for a string of characters that may form an authorization key.

Once the process 800 has obtained a list of potential customer authorization keys from the information garnered from the public Internet repositories of data, the process 800 may include accessing 806 each potential customer key for further examination. For instance, the computing resource service provider may maintain a database of all potential customer authorization keys it has obtained and start to analyze the first key in the database. An analysis of the potential customer authorization keys may consist of comparing the potential key with a second database containing all actual customer authorization keys. For example, the computing resource service provider may perform a string matching query in the database containing all actual authorization keys. If the computing resource service provider utilizes authorization key encryption, such as, but not limited to, hashing or symmetric cryptography, the computing resource service provider may use an encryption key to generate a series of character strings based on a potential key composed of plain text. In this fashion, the computing resource service provider may utilize the new series of character strings and compare them to a second database containing actual, encrypted (e.g., hashed) authorization keys to determine if an account has been compromised.

If the computing resource service provider determines 808 that a potential customer key is an actual authorization key, the computing resource service provider may change 810 the customer account state to "compromised." As noted above, if an account is compromised, the computing resource service provider may restrict certain actions, including all prohibited actions (e.g., administrative actions such as authorization credential changes and modification of certain data within an account). Additionally, the computing resource service provider may notify the affected customer that the account has been compromised and provide a list of steps to secure the account. A compromised account may also trigger the use of a behavior model in conjunction with one or more anomaly detection methods to restrict any anomalous actions within the account. However, if the current potential customer key is determined to not be an actual authorization key, the process 800 may determine 812 if there are any additional potential keys in the database.

The process 800 may be an iterative process if one or more potential keys exist. For instance, if there are any additional potential keys in the database, the computer resource service provider may access 806 the next potential key and compare the potential key with the database of actual keys to determine if an account has been compromised. In this manner, the computing resource service provider may examine each potential key and identify all compromised accounts within the computing resource service. Alternatively, if there are no more potential keys to examine, the process 800 may continue obtaining 802 information from public Internet repositories of data. The information may be obtained at specified time intervals. For example, a computing resource service provider may obtain information from the public Internet repositories of data every four hours in order to refresh the database of potential customer authorization keys.

Figure 9:
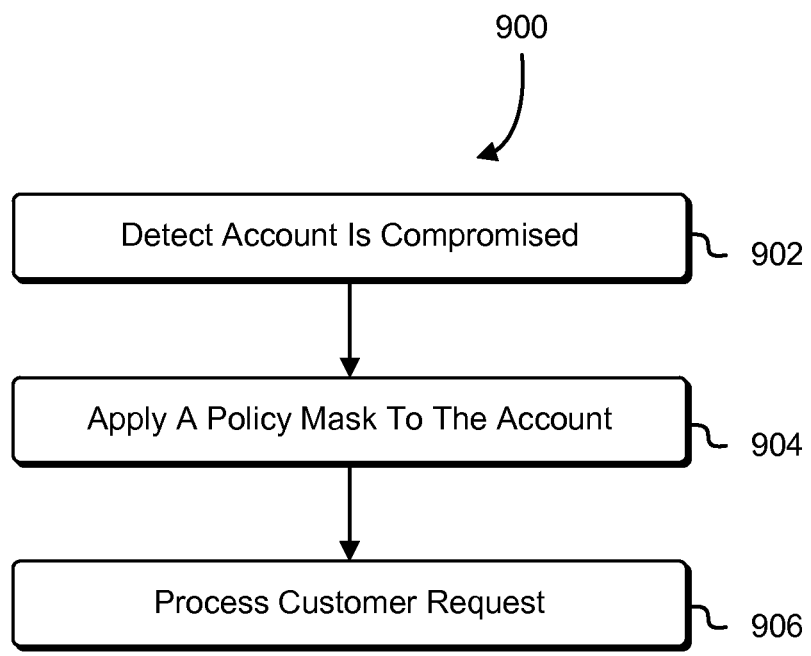
FIG. 9 shows an illustrative example of a process for overriding account policies in accordance with at least one embodiment.

As noted above, if a customer account has been compromised, the computing resource service provider may use an identification and policy management system to restrict certain actions in the account. Accordingly, FIG. 9 is an illustrative example of a process 900 for overriding certain customer policies in a compromised account in accordance with at least one embodiment. In the process 900 a computing resource service provider may detect 902 that a customer account is compromised. For example, as illustrated in FIG. 8, the computing resource service provider may examine a list of potential customer authorization keys to determine whether any are actual authorization keys. If there is a match, the computing resource service provider may place the account in a compromised state. Additionally, the customer may notify the computing resource service provider that one or more account credentials have been, intentionally or unintentionally, compromised. In this instance, the computing resource service provider may place the account in a compromised state upon being notified by the customer.

A customer account may contain certain customer account policies that may enable or restrict certain actions the customer and any delegate user may take in the account. The customer account policies may specifically include a set of rules for performing administrative actions within the account. In a compromised account, the computing resource service provider may seek to prohibit administrative actions from being taken within the account. Thus, the process 900 includes the application 904 of a policy mask to a compromised account. As noted above, a policy mask may be, for example, one that would not alter any customer policies in place in an account but would rather override and disable certain policies until the customer takes remedial actions to secure the account. The policy mask may override existing customer policies until the customer account is no longer compromised. While policy masks disabling administrative actions are used extensively throughout the present disclosure for the purpose of illustration, the scope of the present disclosure is not necessarily limited to the processes explicitly noted herein.

Once the policy mask has been applied to the customer account, the process 900 may process 906 any customer and delegate user requests to perform an action in the compromised account. As noted above, the policy mask may be used to prohibit certain actions, including, but not limited to, any administrative action (e.g., changing an account password, modifying certain data within the account, adding delegate users to the account). Thus, if a customer or delegate user submits a request to perform a prohibited action, such as an administrative action, the computing resource service provider may deny the request. Additionally, as illustrated in FIGS. 6 and 7, the computing resource service provider may utilize a behavior model in conjunction with one or more anomaly detection methods (e.g., cluster analysis, Markov chains) to determine whether a requested action is anomalous or in conformity with prior customer and delegate user behavior. In this fashion, the computing resource service provider may deny any request to perform an anomalous action.

The above embodiments may be applied in various contexts. For example, an electronic mail service provider may implement one or more embodiments to prevent certain actions from being performed in a compromised electronic mail account. Accordingly, a customer of the electronic mail service provider may be able to read an electronic message but would not be permitted to send or delete an electronic message until one or more remedial actions are taken to remove the account from the compromised state. In another example, a social networking service may implement one or more embodiments to enhance certain privacy controls should an account be compromised. For instance, if an account is compromised, the account holder may be able to access the account but may not be able to, among other things, post new photographs, post a status update or add new social connections to the account. In the context of an electronic marketplace, an operator of a marketplace may enable a customer with a compromised account to order items and have the items sent to the address on file but the customer would be prohibited from ordering, for instance, gift cards or changing the shipping address for any ordered items. While these examples are used for the purpose of illustration, the scope of the present disclosure is not necessarily limited to the examples explicitly noted herein.

Figure 10:
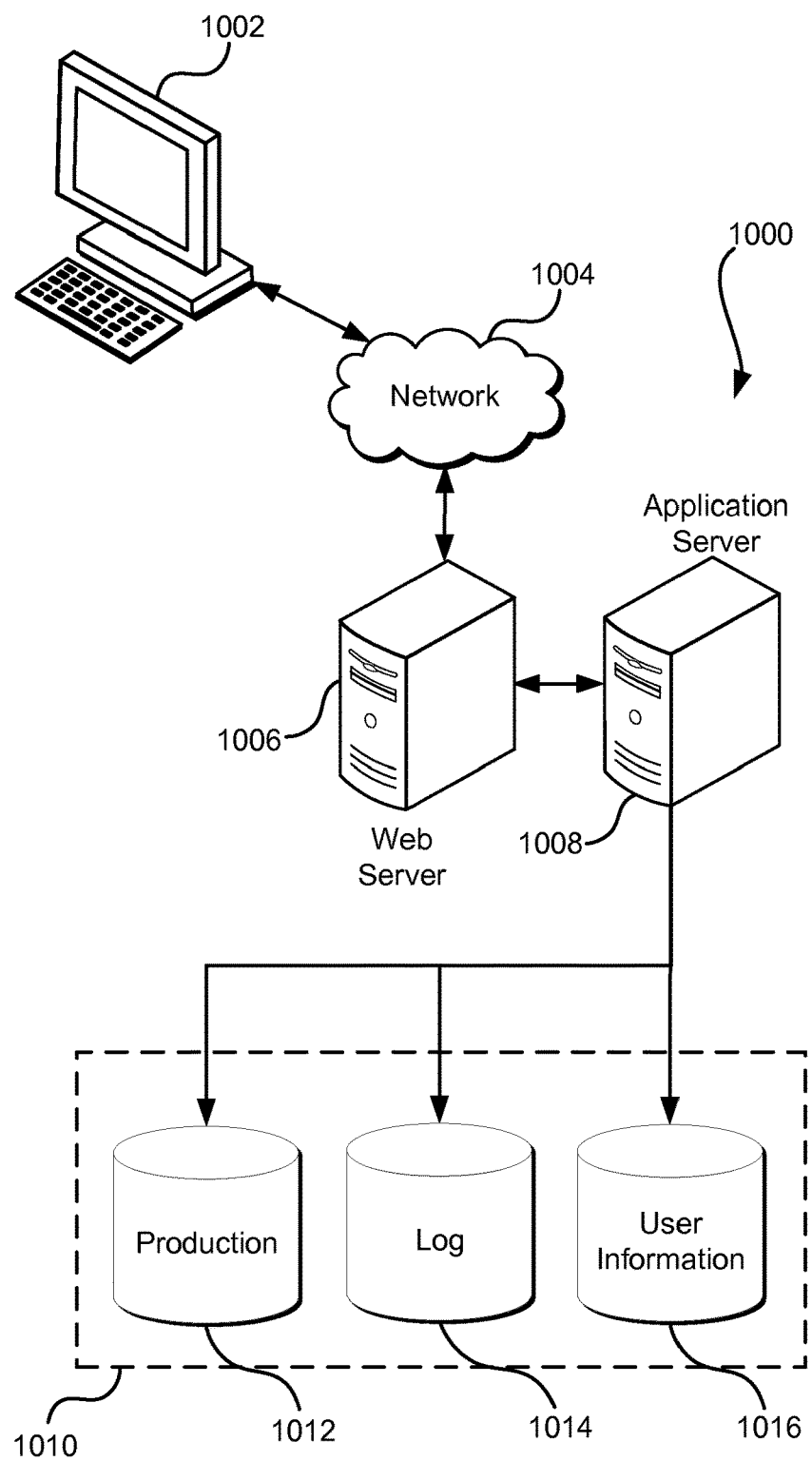
FIG. 10 shows an illustrative example of an environment in which various embodiments may be practiced.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, by a computer system that services an account, that the account is in a compromised state;
    generating, based at least in part on past activity associated with the account, a behavior model of the account;
    evaluating a first set of policies for the account to determine a set of administrative actions and a set of permissible actions executable within the account;
    as a result of determining that the account is in the compromised state, implementing, by the computer system, a second set of policies to supersede the first set of policies to cause a set of restrictions to be applied to the account such that:
        requests to utilize the account to perform any of the set of administrative actions are denied; and
        requests to utilize the account to perform any of the set of permissible actions are evaluated using the behavior model to determine whether to fulfill the requests to utilize the account to perform any of the set of permissible actions.

2. The computer-implemented method of claim 1, wherein the account being in the compromised state is a result of the occurrence of an event involving a set of one or more credentials associated with the account.

3. The computer-implemented method of claim 1, wherein determining that the account is in a compromised state includes:
    obtaining information from one or more externally accessible information resources; and
    determining that the information contains at least one member of a set of one or more credentials associated with the account.

4. The computer-implemented method of claim 1, wherein the requests utilizing the account that were denied would have been approved prior to determining a security compromise in connection with the account.

5. The computer-implemented method of claim 1, wherein the requests utilizing the account to perform any of the set of administrative actions comprise requests to: replace a set of one or more credentials; delete data associated with the account; modify data associated with the account; modify policies associated with the account; add one or more new delegated user accounts; provision one or more new computing resources; or perform actions classified as administrative by an owner of the account.

6. A computer-implemented method, comprising:
    determining, by a computer system, an event in connection with an account serviced by a service provider system;
    generating, based at least in part on past activity associated with the account, a behavior model of the account;
    obtaining a first set of policies for the account;
    evaluating the first set of policies to determine a set of administrative actions and a set of permissible actions executable within the account;
    as a result of determining the event, causing, by the computer system, implementation of the behavior model and a second set of policies that supersede the first set of policies; and
    as a result of the second set of policies being applied to the account:
        denying a first request to perform any administrative action of the set of administrative actions; and
        evaluating, using the behavior model, a second request to perform any permissible action of the set of permissible actions to determine whether to fulfill the second request.

7. The computer-implemented method of claim 6, wherein:
    the account corresponds to a customer of the service provider system; and determining the event includes analyzing information obtained from one or more entities different from the customer.

8. The computer-implemented method of claim 6, wherein:
the account corresponds to a customer of the service provider system; and
determining the event in connection with the account includes receiving, from the customer, a report that the account is compromised comprised.

9. The computer-implemented method of claim 6, wherein the event comprises an account credential of the account becoming available to an unauthorized party.

10. The computer-implemented method of claim 6, further comprises, based at least in part on the second set of policies, denying requests classified according to the behavior model as anomalous.

11. A system, comprising:
one or more processors; and
memory including instructions that, as a result of being executed by the one or more processors, cause the system to:
in response to an event associated with an account resulting in the account being identified as compromised, evaluating a first set of policies for the account to determine a first category of actions and a second category of actions executable within the account;
implement a second set of policies to supersede the first set of policies, the second set of policies encoding a set of restrictions to the account;
generate, based at least in part on past activity associated with the account, a behavior model of the account;
process requests based at least in part on the second set of policies and the behavior model such that:
requests to perform an action classified as part of the first category of actions are denied; and
requests to perform an action classified as part of the second category of actions are evaluated using the behavior model to determine whether the requests to perform the action classified as part of the second category of actions are fulfillable in accordance with the second set of policies.

12. The system of claim 11, wherein the event comprises a credential associated with the account becoming available from an unauthorized party.

13. The system of claim 11, wherein a credential associated with the account comprises secret information for use with cryptographic protocols or a password associated with a username.

14. The system of claim 11, wherein implementation of the second set of policies further causes requests classified according to the behavior model as anomalous to be denied.

15. The system of claim 11, wherein the first category of actions includes actions pre-classified as administrative.

16. One or more non-transitory computer-readable storage media having collectively stored therein instructions that, as a result of being executed by one or more processors of a system, cause the system to:
detect an event in connection with an account;
in response to the event, identify the account as being compromised;
generate, based at least in part on past activity associated with the account, a behavior model of the account;
obtain a first set of policies to determine a first category of actions and a second category of actions executable within the account; and
implement a second set of policies to supersede the first set of policies such that, for each request of a plurality of requests received after the event and purporting to be sent on behalf of the account:
the behavior model is applied to information associated with the request;
a determination, based at least in part on application of the behavior model and the second set of policies, whether the request is fulfillable due to an action specified in the request being classified according to the first category of actions is generated; and
the request is processed in accordance with the generated determination.

17. The one or more non-transitory computer-readable storage media of claim 16, wherein the instructions further cause the system to detect the event by at least:
obtaining information from one or more externally accessible information sources; and
identifying a credential associated with the account from the obtained information.

18. The one or more non-transitory computer-readable storage media of claim 16, wherein the account includes one or more credentials from a group consisting of: secret information for use with cryptographic protocols or a password associated with a username.

19. The one or more non-transitory computer-readable storage media of claim 16, wherein the instructions further cause the system to deny, as a result of the second set of policies being implemented, requests to execute actions classified, according to the behavior model, as anomalous.

20. The one or more non-transitory computer-readable storage media of claim 16, wherein, the information associated with the request includes a time of the request, a source network address of the request, an entity that submitted the request, or a type of credential used to authenticate the request.

21. The one or more non-transitory computer-readable storage media of claim 16, wherein the instructions further cause the system to:
determine, because of a deactivation of a set of one or more compromised account credentials, the account is no longer compromised; and
restore the account to an uncompromised state.

22. The computer-implemented method of claim 1, further comprising:
detecting that the account is no longer in a compromised state; and
removing the second set of policies to restore the first set of policies.

23. The computer-implemented method of claim 6, further comprising, in response to an indication that the event has passed, restoring the first set of policies such that requests to perform any administrative action of the set of administrative actions is fulfilled in accordance with the first set of policies.

24. The system of claim 11, wherein the instructions further cause the system to:
in response to a determination that the event has passed, identify the account as being uncompromised; and
as a result of the account being identified as being uncompromised, removing the second set of policies to cause the first set of policies to be implemented.

25. The one or more non-transitory computer-readable storage media of claim 16, wherein:

the first category of actions comprise actions classified as permissible; and the second category of actions comprise actions classified as administrative.

26. The one or more non-transitory computer-readable storage media of claim 21, wherein the instructions that cause the system to restore the account to the uncompromised state further cause the system to remove the second set of policies to cause the first set of policies to be used in response to new requests to utilize the account.

27. The computer-implemented method of claim 1, wherein evaluation of the requests utilizing the account to perform any of the set of permissible actions using the behavior model includes applying the behavior model to information associated with the requests utilizing the account to perform any of the set of permissible actions.

28. The computer-implemented method of claim 6, wherein evaluating, using the behavior model, the second request further includes applying the behavior model to information associated with the second request to determine whether the information is indicative of an anomalous request.

* * * * *